United States Patent [19]

Boaz

[11] Patent Number: 5,191,857
[45] Date of Patent: Mar. 9, 1993

[54] ELECTRONIC BIRD FEEDER AND BAFFLE

[76] Inventor: John M. D. Boaz, 14222 Rock Canyon Dr., Centreville, Va. 22020

[21] Appl. No.: 894,913

[22] Filed: Jun. 8, 1992

Related U.S. Application Data

[63] Continuation-in-part of Ser. No. 748,546, Aug. 22, 1991, Pat. No. 5,150,665, which is a continuation-in-part of Ser. No. 594,626, Oct. 9, 1990, abandoned.

[51] Int. Cl.$^5$ .............................................. A01K 5/00
[52] U.S. Cl. .................................. 119/52.3; 119/57.9
[58] Field of Search ................... 119/52.4, 56.1, 57.8, 119/57.9, 52.3; 43/108, 98, 112

[56] References Cited

U.S. PATENT DOCUMENTS

| | | | |
|---|---|---|---|
| 3,685,198 | 8/1972 | Smith | 43/112 |
| 4,471,561 | 9/1984 | Lapierre | 43/112 X |
| 5,150,665 | 9/1992 | Boaz | 119/52.3 |

Primary Examiner—Gene Mancene
Assistant Examiner—Thomas Price
Attorney, Agent, or Firm—Aquilino & Welsh

[57] ABSTRACT

An electrical shock baffle for deterring squirrels and other animals from bird feeders, including a support for suspending the baffle, an open electronic circuit interconnected between a conductive portion of the baffle and a conductive portion of the support in order to render one of the conductive portions positively charged and the other of the conductive portions negatively charged so that an electrical shock will result when both the positively charged and negatively charged contacts are simultaneously engaged. The invention also involves the incorporation of the open electronic circuit into a bird feeder and a bird feeder including a bird exit opening and a quick release feed tray.

14 Claims, 5 Drawing Sheets

ELECTRONIC BIRD FEEDER AND BAFFLE

This is a continuation-in-part of Ser. No. 07/748,546 now U.S. Pat. No. 5,150,665 filed Aug. 22, 1991, which was a continuation-in-part of Ser. No. 07/594,626 now filed Oct. 9, 1990.

BACKGROUND OF THE INVENTION

1. Field of the Invention

The present invention relates to bird feeders and accessories for bird feeders, more specifically, bird feeders which incorporate an electrically powered system for shocking squirrels or other animals.

2. Description of the Prior Art

Squirrels can consume large quantities of food very rapidly, and their aggressive nature intimidates birds eating at conventional bird feeders. Therefore, many attempts have been made in the prior art to develop bird feeders which are squirrel-proof. One such attempt is shown by the patent to Doubleday et al. U.S. Pat. No. 2,856,898. The bird feeder of this patent includes an electrical shock device in which the weight of the squirrel via a mechanical assembly triggers the shocking circuit.

Another attempt was to place large umbrella-shaped squirrel guards like that shown in the patent to Blasbalg U.S. Pat. No. 4,327,669 above or below a bird feeder. Squirrel guards of this type are only a temporary deterrent, as in time squirrels will eat through the material of the guard to gain access to the food in the bird feeder.

Another patent found to be of interest is that of Lapierre U.S. Pat. No. 4,471,561, which shows an electronic circuit for killing insects as they crawl up a tree, however, this device deals with high voltages and must always remain on.

SUMMARY OF THE INVENTION

The present invention is directed to an electrical shock baffle for deterring squirrels and other animals from bird feeders, including a support for suspending the baffle, an open electronic circuit interconnected between a conductive portion of the baffle and a conductive portion of the support in order to render one of the conductive portions positively charged and the other of the conductive portions negatively charged so that an electrical shock will result when both the positively charged and negatively charged contacts are simultaneously engaged.

It is the object of the present invention to provide an open electronic circuit system which can be incorporated into various parts of bird feeders in order to deter squirrels or other animals from the bird feeders by means of an electrical shock.

It is another object of the invention to provide a bird feeder having a pair of perches in close proximity to one another which function as oppositely charged contacts for the open electronic circuit.

Another object of the invention is to provide a bird feeder in which the door covering the opening through which seed is introduced is wired to an open electronic circuit in order to deliver a shock to a squirrel upon contact therewith.

Still another object of the present invention is to provide a bird feeder in which the door and the perches located closest to the door serve as oppositely charged contacts such that when simultaneously engaged will result in an electrical shock.

Further, another objective of the invention is to provide a baffle which can be adapted to any bird feeder to deter squirrels or other animals by delivering an electrical shock.

Yet another object of the invention is to provide a bird feeder with a feed tray which can twist-on and twist-off for easy cleaning.

It is another object of the invention to provide a bird feeder with a feed tray which is designed to prevent the collection of moisture therein.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein, however, it is to be understood that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
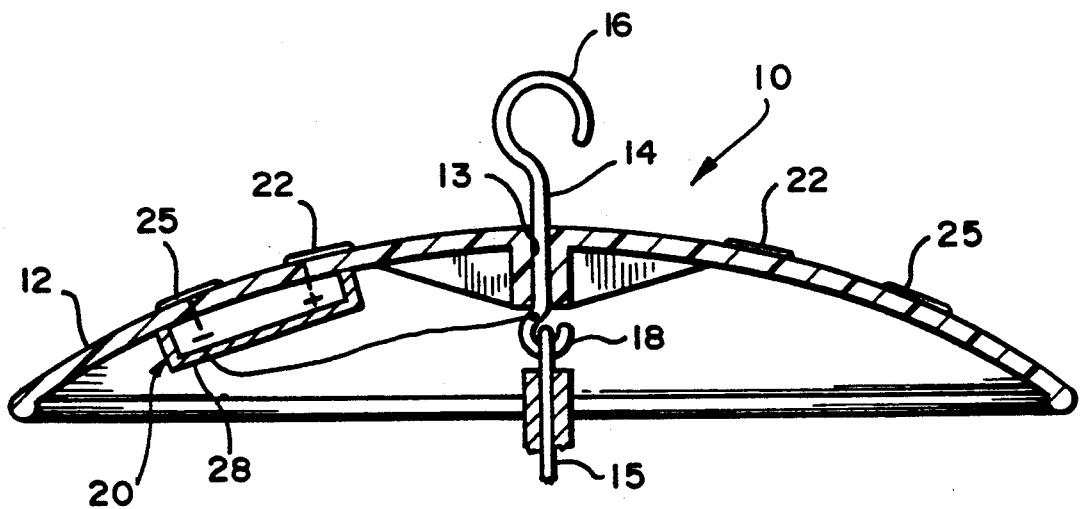
FIG. 1 shows a cross-sectional view of a first embodiment of the animal deterring baffle of the present invention.
Figure 2:
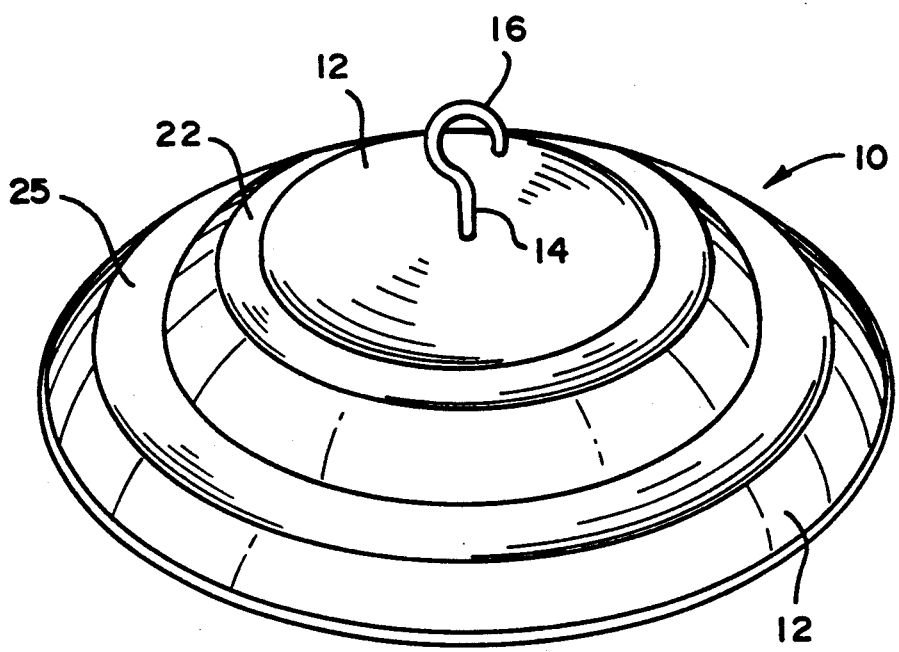
FIG. 2 shows a perspective view of the baffle shown in FIG. 1.

Referring to FIGS. 1 and 2, an electrical shock animal deterring device 10 of the present invention will be described. The electrical shock animal deterring device 10 includes a baffle 12 which in this embodiment is shown to be of an umbrella shape. As in all embodiments, the baffle may be made from a conductive material such as metal or from a non-conductive material such as plastic.

The baffle 12 has a central aperture 13 through which a support member 14 may be inserted in order to suspend the baffle 12. The support member 14 includes an upper hook 16 and a lower hook 18. The upper hook 16 is adapted to support the baffle 12, whereas the lower hook 18 is adapted to be connected to a bird feeder suspension assembly 15.

Figure 9:
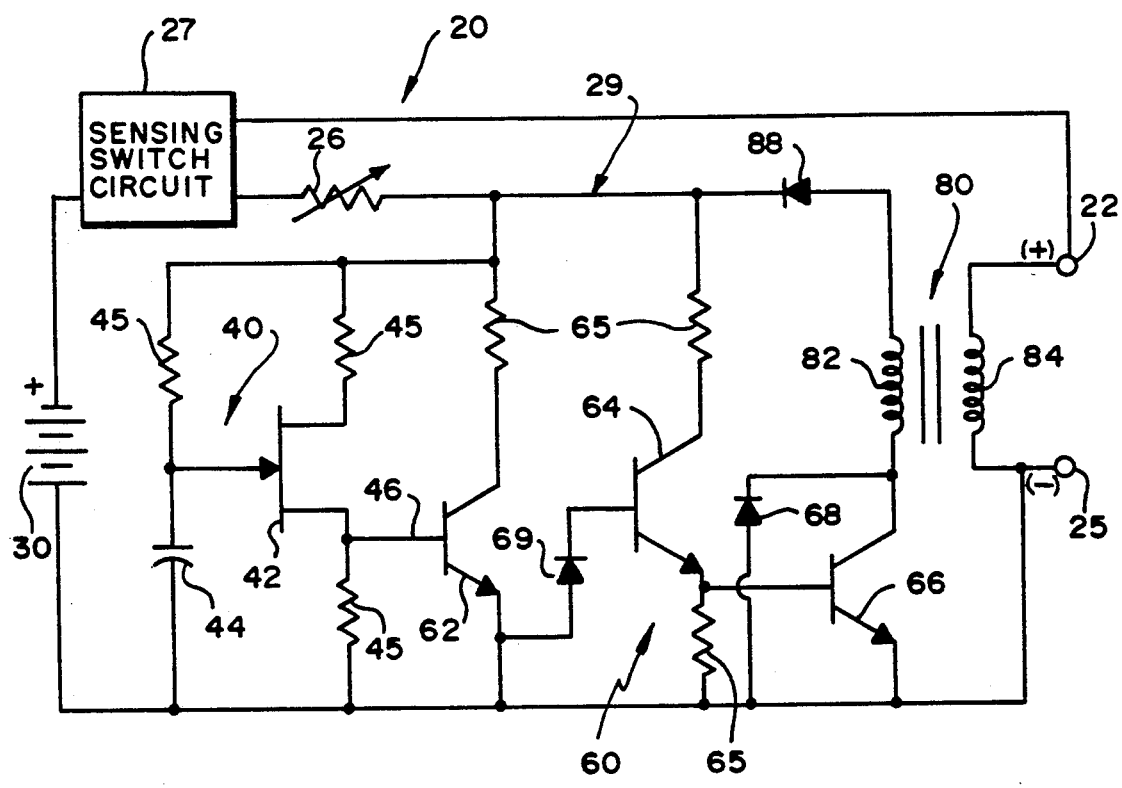
FIG. 9 is a schematic view of the electrical system of the present invention.

The device 10 further includes an open electronic circuit system 20 for delivering an electrical shock to an animal when the animal serves as a conductor to close the normally open electronic circuit. Generally, referring to FIG. 9, the normally open electronic circuit system 20 includes a pair of contacts 22 and 25 which are wired or connected to a shock generating circuit 29 so as to be oppositely charged and a battery conserving sensing switch circuit 27 positioned between the battery 30 and the shock generating circuit 29 which functions to control the current flowing to the shock generating circuit 29 when an animal is near the device or makes contact with one of said contacts. The sensing switch circuit 27 conserves the power of battery 30, as it prevents current from constantly flowing into and building up in the shock generating circuit 29. The sensing switch circuit 27 could be comprised of numerous known systems, such as a capacitance switching arrangement, a triac, or a transistor and biasing circuit. The transistor and biasing circuit would function to detect a voltage change when contacts 22 and 25 are simultaneously engaged, and as a result of the sensed change, inherently functions as a switch to turn the shock generating circuit 29 on, while preventing current from the battery from running directly to contact 22. Once a shock is given to the animal in engagement with the contacts, the shock generating circuit 29 recycles for a predetermined time and will continue to deliver shocks to an animal which remains in engagement with both contacts. Once simultaneous contact has been broken and a shock delivered, the flow of current into the shock generating circuit 29 will be restricted again by sensing switch circuit 27. The shock generating circuit 29, as shown in FIG. 9, incldes a pulsing circuit 40 including a transistor 42, a capacitor 44 and appropriate resistors 45 for transmitting an electrical pulse on line 46 to amplifier circuit 60. The amplifier circuit 60 includes transistors 62, 64 and 66 and appropriate resistors 65 for progressively amplifying the pulse generated by the pulsing circuit 40. The voltage of the pulse is amplified by a transformer circuit 80 such that a sufficiently high voltage across winding 84 is generated when current is drawn across normally open contacts 22 and 25. Diode 88 dumps the current back into the battery 30 if engagement of contacts 22 and 25 is broken before a shock is generated. Diodes 68 and 69 protect the transistors of the amplifying circuit 60 from the high voltage pulse which is being dumped back into the battery 30. A variable gain resistor 26 is incorporated into the system 20 in order to physically control the amount of current allowed to run into the shock generating circuit 29 A housing 28 encloses the components of the open electrical circuit system 20 in order to protect them from the elements. Positively charged contact 22 and a negatively charged contact 25 are both in the form of conductive rings spaced from one another on the baffle 12. Support member 14 may also be wired to the open electronic circuit 20 to provide an additional charged negative contact.

In operation, device 10 would be mounted above a bird feeder, thus, a squirrel ascending down a tree onto the baffle 12 would hold onto the support member 14 so as to prevent itself from sliding off the outer curved surface of the baffle 12. The squirrel, while still holding onto charged support member 14, would try to proceed to the edge of the baffle 12 in order to get to the bird food. When the squirrel comes into contact with oppositely charged contact 22 and completes the open electronic circuit system 20, the device will be activated and the shock generating circuit 29 will have powered up to the appropriate voltage level and deliver an electrical shock to the animal in contact with the pair of oppositely charged contacts 14 and 22. This shock would be of a sufficient voltage level to scare the squirrel away, but would not cause the squirrel any permanent harm. Alternatively, if the squirrel did not continue to hold on to the support member 14, it would still close the open electrical circuit system 20 when it was in engagement with both contacts 22 and 25. It is evident that unless a squirrel or other animal, such as a cat, is intelligent enough to avoid a pair of oppositely charged contacts, it will receive an electrical shock in the normal course of coming into contact with the suspended baffle 12, but birds, due to their small size, would not simultaneously engage a pair of contacts.

Figure 3:
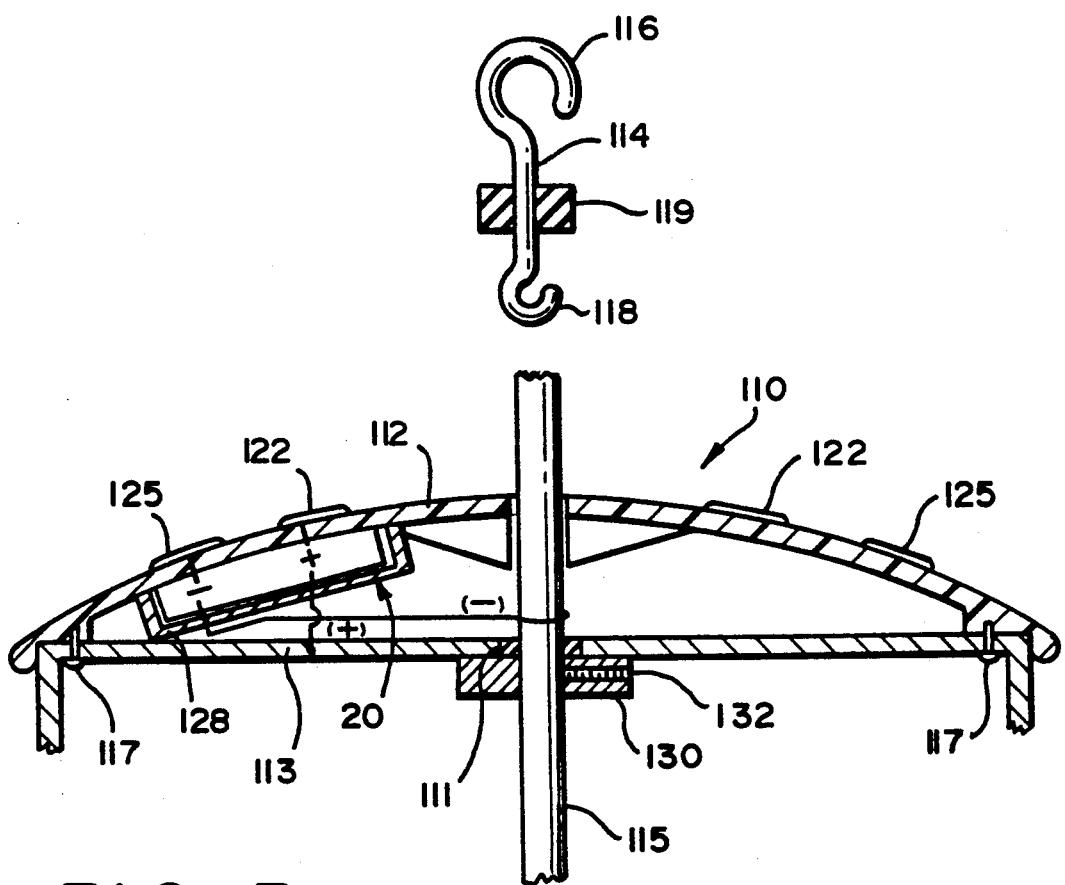
FIG. 3 shows a cross-sectional view of a second embodiment of the animal deterring baffle of the present invention.

FIG. 3 displays a second modified version of the invention of FIGS. 1 and 2. In this electrical shock animal deterring device 110, a conductive base plate 111 is secured to the underside of baffle 112 by a plurality of fasteners 117. Conductive base plate 113 is connected to the open electrical circuit 20 so as to have a charge opposite of that of the support pole 115, which as shown, is connected to the negative side of the open electronic circuit 20.

An insulating ring 111 is used to separate the base plate 113 from the support pole 115 in order to avoid shorting of the open electrical circuit 20. Baffle 112 is supported on pole 115 by any suitable clamp 130. As shown, insulation ring 111 also functions to maintain the clamp 130 spaced from the base plate 113. Clamp 130 could be made from a non-conductive material or it could have its own insulation to avoid completion of the open circuit between the base plate 113 and the support pole 115. Clamp 130 includes a threaded aperture which receives a threaded fastener 132 for tightening the clamp 130 against support pole 115.

It is possible in the embodiment of FIG. 3 to substitute hook support member 114 for pole support 115. Hook support member 114 includes an insulation grommet 119 spaced between end hooks 116 and 118. In order to substitute, open electronic circuit 20 would be disconnected from pole 115 and rewired to hook support 114 once inserted in place of pole support 115.

In operation of the device 110 of FIG. 3, an animal could now be shocked from either the top or the bottom of the device. An animal approaching from the bottom climbing pole 115 would close the circuit 20 when it contacts base plate 113. An animal approaching from the top would be shocked in the same manner as set forth in the above embodiments of FIGS. 1 and 2.

Figure 4:
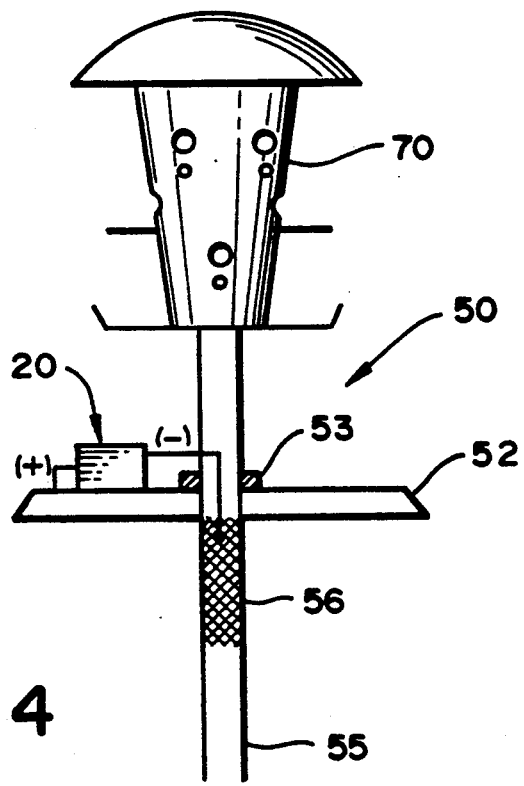
FIG. 4 shows a third embodiment of the animal deterring baffle mounted to a pole supporting a bird feeder.

Turning to FIG. 4, a very simple form of pole mounted animal deterrent device 50 is shown. At the top of the pole 55 is a bird feeder 70 which is protected from squirrels by baffle 52. In this embodiment, baffle 52 is made from a conductive material and pole 55 is made from a non-conductive material, such as wood or plastic. Baffle 52 is secured to pole 55 by clamp 53. The open electronic circuit system 20 functions in the same manner as previously described. However, since pole 55 is non-conductive, a metal mesh wrap 56 is required to be mounted around the pole 55 below baffle 52. The mesh wrap 56 is connected or wired to the negative side of the shock generating circuit 29 to form a negative contact and the baffle is connected to the shock generating circuit 29 to function as a positively charged contact. Thus, an animal in simultaneous contact with baffle 52 and metal wrap 56 will close the circuit and receive an electrical shock.

Figure 5:
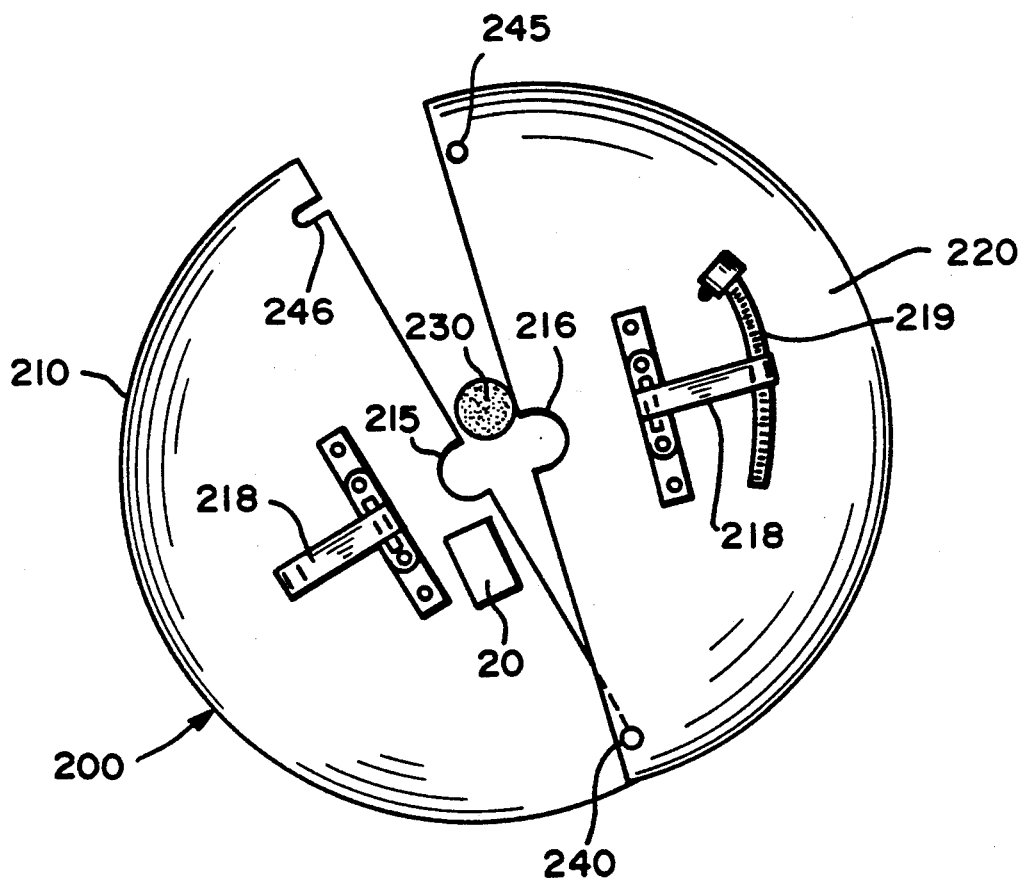
FIG. 5 shows a top view of another embodiment of the animal deterring baffle.
Figure 6:
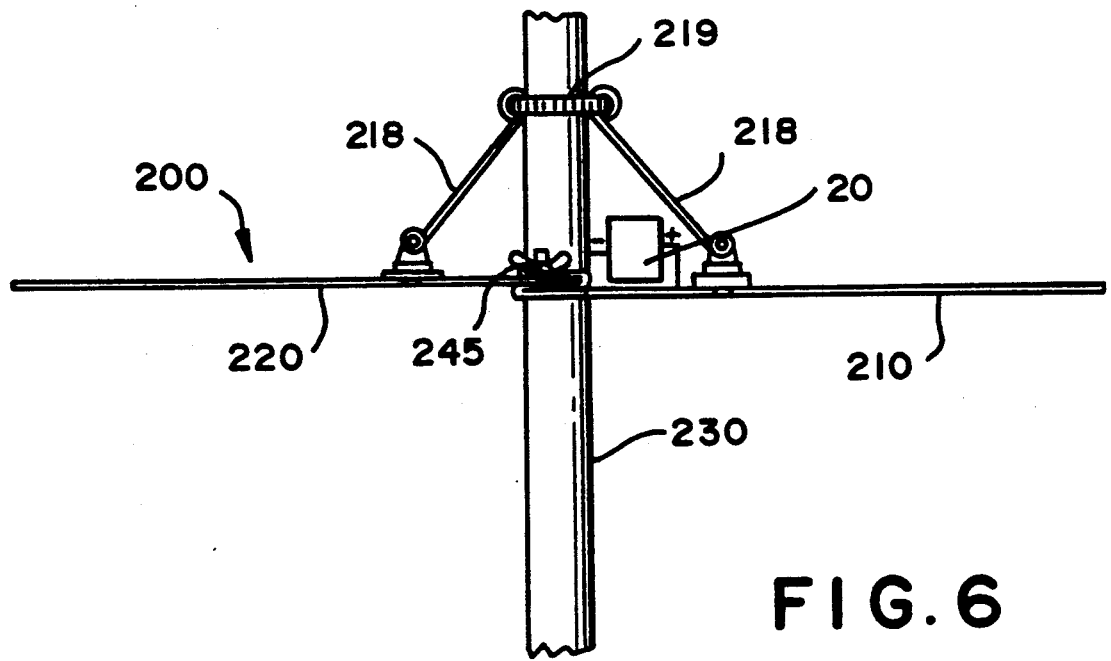
FIG. 6 shows a side view of the embodiment shown in FIG. 5.

FIGS. 5 and 6 show a two-piece baffle 200 which is formed from a first semi-circular section 210 and a second semi-circular section 220. The two sections include central cut-outs 215 and 216 of various sizes and shapes in order to allow the baffle 200 to be secured to a stationary support, such as a pole embedded within the ground. Adjustable clamp 219 cooperates with braces 218 to secure baffle 200 to support pole 230. Baffle sections 210 and 220 are hinged together by fasteners 240 and are secured together by fastener 245 located on section 220 to cooperate with slot 246 on section 210.

Figure 7:
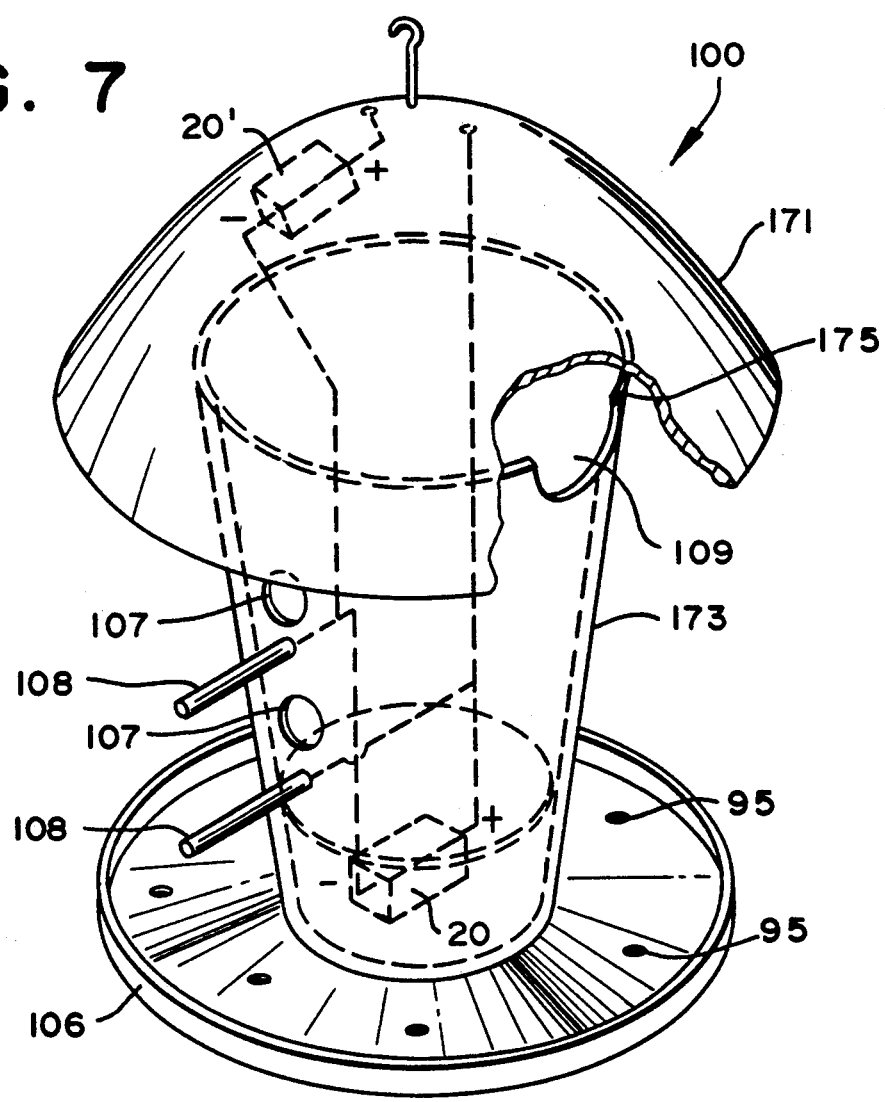
FIG. 7 shows a partially cut-away perspective view of a bird feeder incorporating the electronics of the present invention.

FIG. 7 shows a bird feeder 100 including a door 171 in the form of an umbrella-shaped squirrel deterrent baffle at the top of the food reservoir 173. The top edge 175 of food reservoir 173 includes a cut-out 109. Cut-out 109 in conjunction with door 171 functions as a bird exit. Often, birds in their pursuit of food will force themselves through a small feeding access hole 107 and become trapped within the interior of reservoir 173. Therefore, in order to avoid the unintentional killing of birds, cut-out 109 is made larger than any of the feeding access holes 107, which provides a trapped bird with a sufficiently sized exit.

Figure 8:
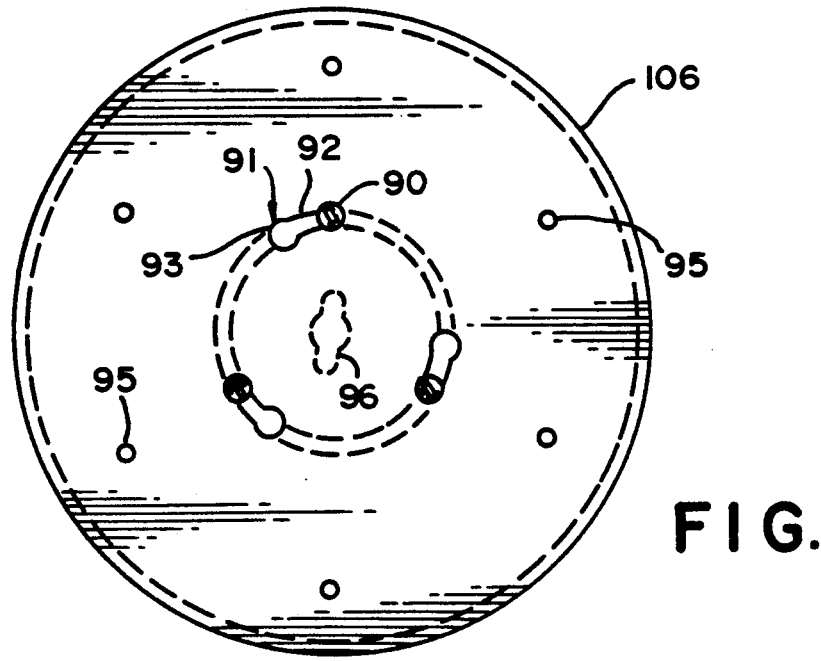
FIG. 8 shows a bottom view of the bird feeder shown in FIG. 7.

Located at the bottom end of reservoir 173 is a twist-on, twist-off feed tray 106. As best seen in FIG. 8, the feed tray 106 includes apertures 91 in the form of slot 92 with a larger circular head 93. The apertures are arranged in a circular pattern so as to cooperate with screw heads 90 connected to the bottom of reservoir 173. To secure feed tray 106 to reservoir 173, aperture heads 93 are aligned with screw heads 90 and then feed tray 106 is turned or twisted counterclockwise, locking the screw heads 90 in slots 92. To remove feed tray 106, it is turned clockwise until screw heads 90 are back in alignment with aperture heads 93. Various other twist-on, twist-off assemblies could be used, such as a central aperture 96 shown in dotted lines which would cooperate with a center rod (not shown) having an end dimensioned to fit within the longer portion of aperture 96. Once removed, feed tray 106 may easily be washed and dried. Feed tray 106 slopes away from the reservoir and includes drain holes 95 for preventing water from collecting in feed tray 106.

Bird feeder 100 also includes an open electronic circuit system 20 which is the same as that described in conjunction with FIG. 1. System 20 can be wired to oppositely charge a pair of perches 108 and/or the system 20 could be connected to oppositely charge a portion of door 171 and a selected perch 108. As shown in dotted lines, open electronic circuit system 20, which is shown as 20, when mounted to door 171, can be mounted at various locations on the bird feeder depending upon the proximity of the elements of bird feeder 100 to be connected to the open electronic circuit system 20 or 20'.

While various preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. An electrical shock baffle for use with bird feeders comprising:
   a baffle;
   an attachment means for suspending the baffle; and
   an open electronic circuit means for producing an electrical shock interconnected between a conductive portion of said baffle and a conductive portion of said attachment means whereby one of said conductive portions forms a positive contact and the other of said conductive portions forms a negative contact so that an electrical shock will result when both said positive and negative contacts are simultaneously engaged.

2. The invention of claim 1 wherein said attachment means includes a hook.

3. The invention of claim 1 wherein said attachment means includes an elongated pole.

4. The invention of claim 3 wherein said pole is metal.

5. The invention of claim 3 wherein said pole is non-conductive and the conductive portion is in the form of a metal wrap around said pole.

6. The invention of claim 1 wherein said baffle includes a second conductive portion which is connected to said electronic circuit means in order to form a contact having the same charge as said conductive portion of said attachment means.

7. The invention of claim 1 wherein said baffle further includes a conductive base plate attached thereto which is connected to said electronic circuit means in order to form a contact having the same charge as said conductive portion of said baffle.

8. The invention of claim 1 wherein said baffle is formed from a plurality of sections which interconnect together in order to wrap variously dimensioned supports.

9. An electrical shock baffle for use with bird feeders comprising:
   a disc-shaped baffle;
   an attachment means for suspending the baffle; and
   an open electronic circuit means for producing an electrical shock interconnected between a first conductive portion of said baffle and a second conductive portion of said baffle whereby one of said conductive portions forms a positive contact and the other of said conductive portions forms a negative contact so that an electrical shock will result when both said positive and negative contacts are simultaneously engaged.

10. The invention of claim 9 wherein said attachment means is in the form of a clamp.

11. The invention of claim 9 wherein said baffle is formed from a plurality of sections which interconnect together in order to wrap variously dimensioned supports.

12. A bird feeder comprising:
    a hollow, geometrically-shaped reservoir with a top opening and side walls which extend down to a bottom;
    a door shaped as a squirrel deterrent baffle located at the top of said reservoir to cover the opening;
    an access hole through the side wall of said reservoir;
    a perch cooperating with said access hole;
    a portion of said door being conductive and said perch being conductive; and
    an open electrical circuit means interconnected between said conductive portion of said door and said conductive perch so as to form negative and positively charged contacts, which when simultaneously engaged, results in an electrical shock.

13. The invention of claim 12, further including a plurality of access holes and perches, wherein the perches may be connected to the open electrical circuit means so as to provide other charged contacts.

14. A bird feeder comprising:

a hollow geometrically-shaped reservoir with a feed filling opening and side walls which extend down to a bottom;
a cover located to cover said feed filling opening;
a plurality of access holes through the side walls of said reservoir;
a perch cooperating with each access hole; and
wherein at least one of said perches is negatively conductive and at least one of said perches is positively conductive when interconnected by an open electrical circuit means which will close and give an electrical shock when said negatively conductive and positively conductive perch are simultaneously contacted.

* * * * *